G. W. WURTZ.
MOVABLE HAY RACK ATTACHMENT.
APPLICATION FILED APR. 3, 1916.
1,199,142.
Patented Sept. 26, 1916.
2 SHEETS—SHEET 1.
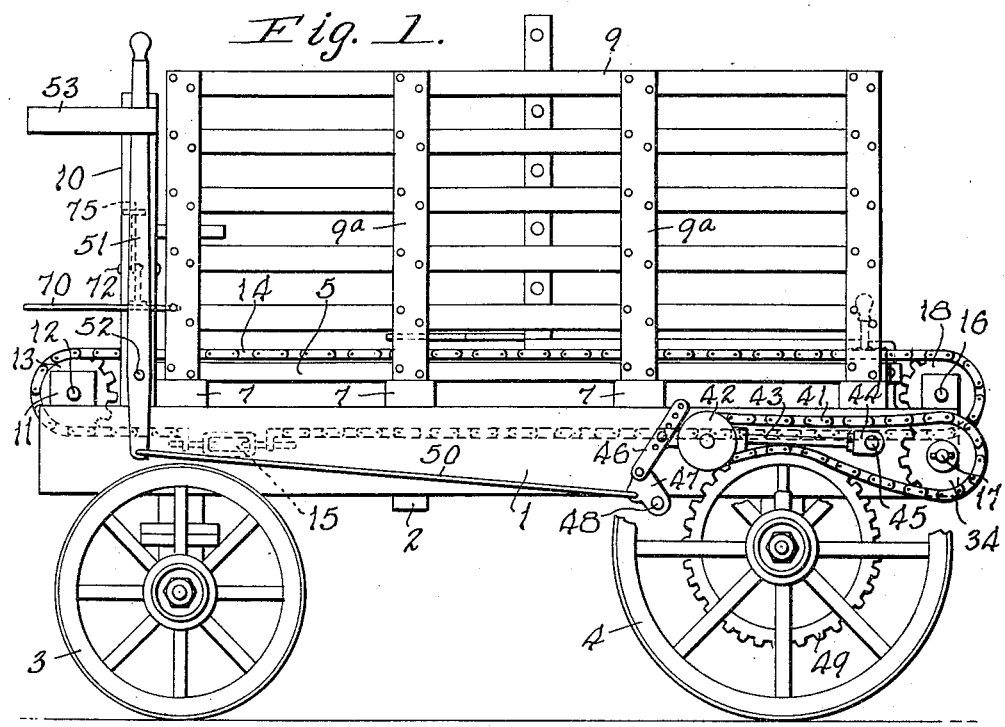
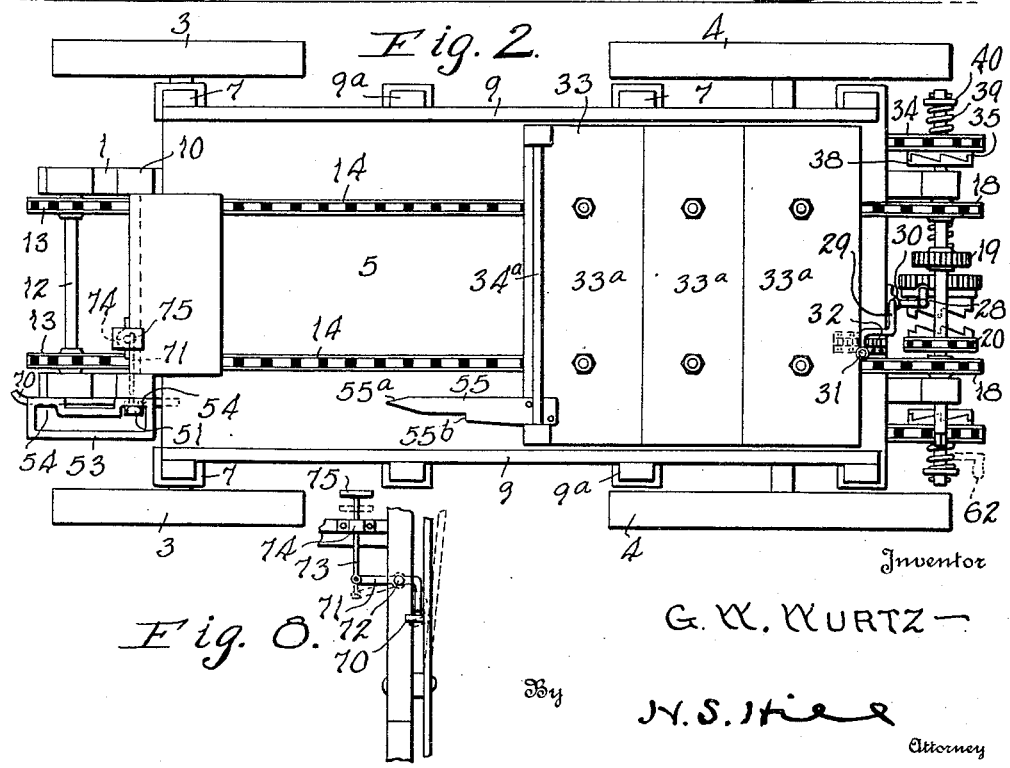
Inventor
G. W. Wurtz
By
N. S. Hier
Attorney

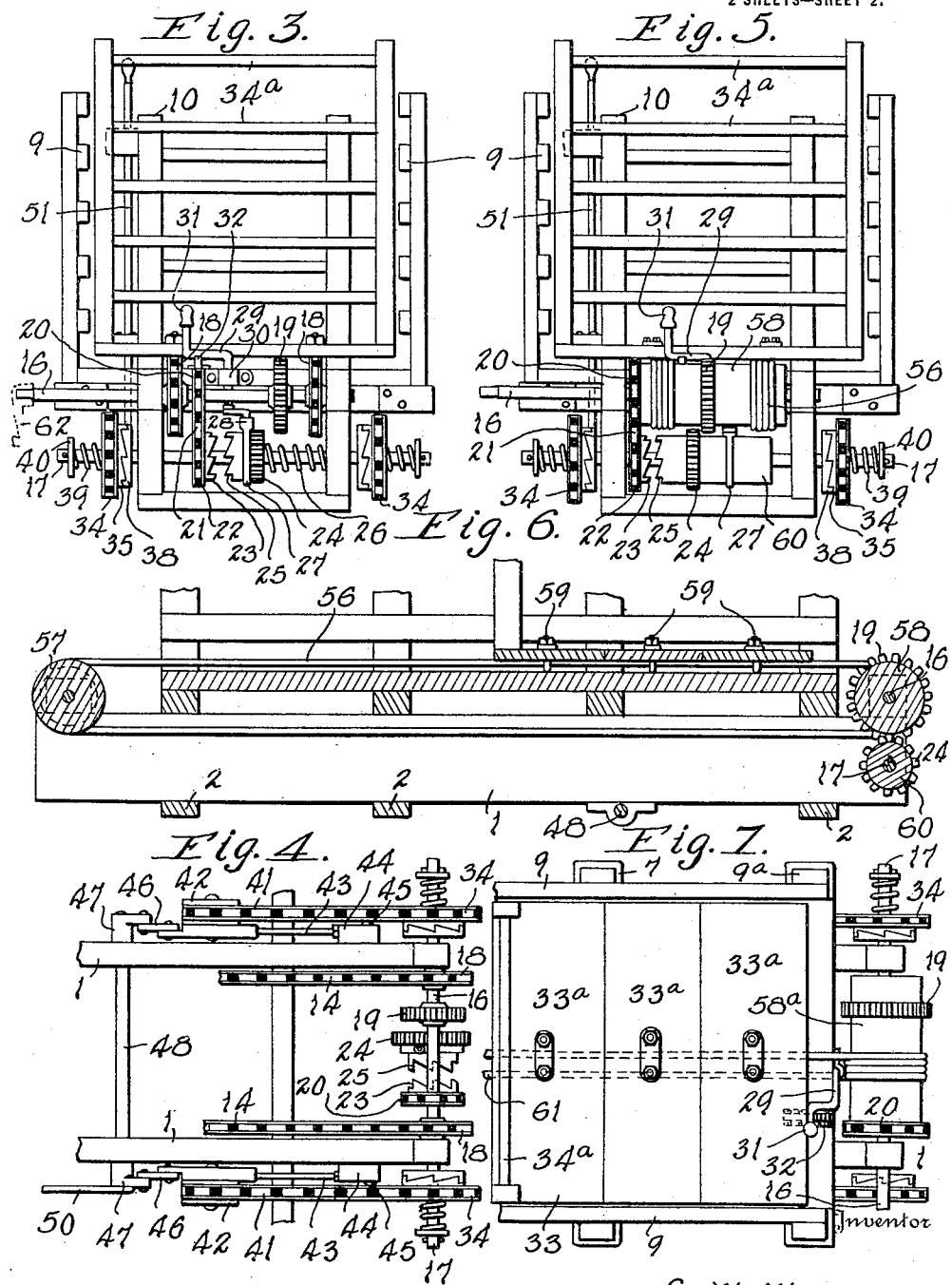

UNITED STATES PATENT OFFICE.

GEORGE W. WURTZ, OF INDEPENDENCE, IOWA.

MOVABLE HAY-RACK ATTACHMENT.

1,199,142.      Specification of Letters Patent.      Patented Sept. 26, 1916.

Application filed April 3, 1916. Serial No. 88,531.

*To all whom it may concern:*

Be it known that I, GEORGE W. WURTZ, a citizen of the United States, residing at Independence, in the county of Buchanan, State of Iowa, have invented a new and useful Movable Hay-Rack Attachment; and I do hereby declare the following to be a full, clear, and exact description of the invention, such as will enable others skilled in the art to which it appertains to make and use the same.

The present invention relates to certain new and useful improvements in hay racks, and has for its object to provide a device of this character which includes a movable platform and novel means for sliding the same back and forth upon the hay rack in such a manner as to admit of the rack being loaded with hay by means of a hay loader without the necessity of manually distributing the hay upon the rack after it has been discharged by the loader.

Further objects of the invention are to provide a movable hay rack which is comparatively simple and inexpensive in its construction, which can be easily and quickly operated, which is at all times under the perfect control of the operator, which eliminates the necessity for any laborious manual distribution of the hay upon the rack, and which comprises few and durable parts such as are not liable to get out of repair.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a hay rack constructed in accordance with the invention, portions of the rear wheel of the vehicle being broken away, the movable platform being shown at the rear end of the hay rack with the gearing properly adjusted for driving the movable platform to the front of the hay rack when the machine is advanced. Fig. 2 is a top plan view, the shifting gear being shown by full lines in inoperative position and by dotted lines in operative position. Fig. 3 is a rear view of the hay rack with the running gear omitted, the sliding gear being shown in an inoperative position. Fig. 4 is a top plan view of the gearing at the rear end of the hay rack, the sliding gear being shown in an inoperative position. Fig. 5 is a rear view of a hay rack embodying a modified form of the invention, the running gear of the vehicle being omitted. Fig. 6 is a longitudinal sectional view through the bed of the hay rack, also showing the modified construction. Fig. 7 is a plan view of the rear end of the hay rack showing a still further modification. Fig. 8 is a detail view of the foot operated mechanism for flexing the hand lever at the front of the hay rack preparatory to shifting the position thereof.

Corresponding and like parts are referred to in the following description and indicated in all the views of the drawings by the same reference characters.

Referring to the drawings, the numerals 1 designate a pair of longitudinal sills which may be suitably mounted upon the running gear, and are connected at the lower edges thereof by suitable cross bars 2. The running gear may be of any conventional construction, and includes the usual front wheels 3 and rear wheels 4. Disposed over the sills 1 is the bed 5 of the hay rack, said bed being secured to transverse beams 6 which rest upon the sills 1 and project laterally upon opposite sides thereof. The extremities of the transverse beams 6 are provided with keepers 7 which receive the lower ends of the upright posts 9$^a$ of side frames 9 to retain the latter in position. At the front of the bed 5 the usual head frame 10 is provided.

Mounted upon the forward ends of the sills 1 at the front of the hay rack are bearing blocks 11 between which a transverse shaft 12 is journaled. A pair of sprocket wheels 13 are rigidly applied to the transverse shaft 12 for engagement with the endless sprocket chains 14. Any suitable means may be provided for tightening and loosening the endless sprocket chains 14 for the purpose of maintaining the proper tension therein, and, in the present instance, the chains are shown as provided at suitable points with the turn buckles 15.

At the rear ends of the sills 1 suitable bearings are provided within which an upper transverse shaft 16, and a lower transverse shaft 17 are journaled, said shafts having a parallel relation to each other, and the upper shaft 16 being provided with sprocket wheels 18 corresponding to the front sprocket wheels 13, and around which the endless chains 14 pass. At a point between the sprocket wheels 18 the upper shaft 16 is provided with a rigid gear wheel 19 and a rigid sprocket wheel 20. The sprocket wheel 20 is connected by a sprocket chain 21 to a sprocket wheel 22 which is loose upon the lower shaft 17, being provided on one side thereof with a clutch face 23. Slidably mounted upon the lower shaft 17 and keyed thereon is a shiftable gear wheel 24 which has a clutch face 25 on one side thereof, said clutch face being adapted to be brought into engagement with the clutch face 23 of the sprocket wheel 22 so as to lock the latter with the lower shaft 17. A coil spring 26 surrounds the lower shaft 17 and is interposed between the sliding gear 24 and one of the bearings, said spring normally tending to move the sliding gear toward the loose sprocket wheel 22 so as to hold the clutch faces 23 and 25 in engagement with each other.

A collar 27 loosely engages the sliding gear 24, said collar being suitably connected by a loose joint 28 to one end of a gear shifting lever 29. This lever 29 is journaled within a bearing 30 at the end of the bed 5 of the hay rack, the upper end of the lever being provided with a handle 31 and having a spring engagement with a notched rack 32 on the bed 5. It will be remembered that the sliding gear 24 is keyed upon the lower shaft 17 so that it always revolves therewith, and the normal position of the sliding gear is at an intermediate point between the loose sprocket wheel 22 of the lower shaft 17 and the rigid gear wheel 19 of the upper shaft 16. There is then no connection between the lower shaft 17 and the upper shaft 16, and either shaft can turn independently of the other shaft. However, by suitably manipulating the gear shifting lever 29 the sliding gear 24 can be moved in either direction. When this sliding gear 24 is moved in one direction it is brought into mesh with the gear wheel 19 of the upper shaft 16, thereby locking the two shafts 16 and 17 together so that they will rotate in opposite directions when either shaft is turned, and when it is moved in the opposite direction the clutch faces 23 and 25 are brought into engagement with each other so as to lock the loose sprocket wheel 22 to the lower shaft 17, thereby connecting the two shafts 16 and 17 so that they will rotate in the same direction.

The upper reaches of the endless chain 14 slide over the top of the bed 5, while the lower reaches thereof pass under the said bed 5. A platform 33 is secured to the upper reaches of the chains 14, said platform being of the full width of the bed 5, and of substantially half the length thereof so as to cover about one half of the area of the bed. For convenience in construction this platform 33 may be formed in a number of sections 33ª which are suitably secured to the chains 14. A transversely extending upright frame 34ª is provided at the forward end of the sliding platform 33 to prevent hay which is loaded upon the platform from falling over upon the bed 5 in front thereof.

In the initial stage of loading the hay rack, the platform 33 is moved to the rear thereof and the hay loaded directly upon the platform by means of any of the usual loading machines. After the desired amount of hay has been loaded upon the platform 33 it is moved to the front of the rack by means of the chain and sprocket connection. The hay previously loaded upon the platform is thus moved bodily to the front of the hay rack, leaving the rear end of the hay rack clear so that hay can be loaded directly thereon from the loading machine. In this manner the hay rack can be quickly loaded directly from the loader without any necessity for manually distributing the hay upon the rack and laboriously moving the hay to the front thereof as it is piled upon the rear end of the rack from the loading machine.

Loosely mounted upon opposite ends of the lower transverse shaft 17 at the rear end of the ray rack are sprocket wheels 34, said sprocket wheels being provided with clutch faces 35 which are adapted to engage clutch disks 38 rigid with the shaft, thereby locking the sprocket wheels with the shaft when the former are rotated in the proper direction for moving the platform 33. Coil springs 39 which surround the shaft 17 and are interposed between the sprocket wheels 34 and disks 40 serve to normally hold the clutch faces 35 of the sprocket wheels in a yielding engagement with the clutch disks 38, so that the sprocket wheels are locked with the shaft 17 when rotated in a proper direction for actuating the platform, although they can rotate in the opposite direction independently of the shaft.

The sprocket wheels 34 are engaged by endless sprocket chains 41 which also pass around idlers 42 carried by the swinging ends of arms 43 which are carried by and project from blocks 44, said blocks being pivoted at 45 to the longitudinal sills 1 of the hay rack. The swinging ends of the arms 43 are adjustably connected by means of links 46 to the ends of crank arms 47 which are rigid with opposite ends of a transverse shaft 48, said shaft extending under the hay rack and being journaled within suitable bearings applied thereto. The crank arms 47 and link members 46 provide in effect toggle levers for swinging the arms 43 up and down to move the chains 41 into and out of mesh with large sprocket wheels 49 applied to the rear wheels 4 of the running gear. When the arms 43 are swung upwardly the chains 14 are disengaged from the sprocket wheels 49 so that the hay rack can be moved from place to place without driving the sprocket wheels 34 upon the lower shaft 17 at the rear end of the rack. However, when the arms 43 are swung downwardly so as to bring the chains 41 into engagement with the large sprocket wheels 49, and the hay rack is moved forward, motion will be transmitted from the rear wheels 4 of the running gear to the sprockets 34 and the lower transverse shaft 17. If the sliding gear 24 is brought into mesh with the gear wheel 19 of the upper shaft 16, the platform 33 will then be moved toward the front end of the hay rack, although if the sliding gear 24 is moved in the opposite direction so as to bring the clutch faces 23 and 25 into engagement with each other, the platform 33 will be moved toward the rear end of the hay rack.

One of the crank arms 47 of the shaft 48 is connected by a forwardly extending link member 50 to the lower end of an upright lever 51 which is arranged at the forward end of the hay rack and pivotally connected thereto at a point spaced from the lower end thereof, as indicated at 52. This lever 51 controls the swinging arms 43 and by manipulating this lever the sprocket chain 41 can be moved into and out of engagement with the large sprocket wheels 49. The upper end of the lever 51 operates within a keeper 53 which has notched seats 54 at opposite ends of one side thereof. The lever 51 is formed of spring material so as to be sprung laterally out of engagement with either one of the notched seats 54 when it is desired to move the lever in either direction, although the resiliency of the lever normally tends to spring it into engagement with one of the notched seats. When the upper end of the lever 51 is swung rearwardly the sprocket chains 41 are dropped into engagement with the large sprocket wheels 49 upon the rear wheels 4, so that upon a forward movement of the vehicle the lower transverse shaft 17 at the rear end of the hay rack will be rotated. If the sliding gear wheel 24 is then in mesh with the rigid gear wheel 19 of the upper shaft 16, the platform 33 will be moved toward the front of the hay rack. A trip finger 55 projects forwardly from one side of the platform 33, said finger being provided with a pointed end 55$^a$ and with a shoulder 55$^b$. When the platform 33 reaches the forward limit of its movement, the pointed end 55$^a$ of the trip finger engages one side of the lever 51 to flex it laterally and disengage it from the rear notched seat 54 of the keeper 53, after which the shoulder 55$^b$ engages the lever 51 to swing it forwardly. This forward movement of the lever 51 operates, as has been previously described, to swing the arms 43 upwardly and disengage the sprocket chains 41 from the large sprocket wheel 49 of the rear wheel 4. The platform 33 is thus automatically stopped at the forward limit of its movement without danger of straining or breaking any of the parts of the mechanism. When it is desired to move the platform 33 from the front to the rear of the hay rack, the gear shifting lever 29 is manipulated to move the sliding gear 24 away from the rigid gear 19 of the upper shaft 16 and bring the clutch faces 23 and 25 into engagement with each other, thereby locking the loose sprocket wheel 22 with the lower shaft 17. The main lever 51 is then flexed laterally to disengage it from the shoulder 55$^b$ of the trip finger 55 and swung rearwardly, thereby causing the sprocket chains 41 of the driving mechanism to be lowered into mesh with the large sprocket wheels 49 of the gear wheels 4. When the vehicle is moved forwardly the platform 33 will now be forcibly drawn toward the rear end of the hay rack. When it reaches the limit of its movement it will engage the handle 31 of the gear shifting lever 29 and move the same rearwardly, thereby causing the gear shifting lever to slide the gear 24 upon the lower shaft 17 until the clutch connection between the said gear wheel and the loose sprocket wheel is broken. The platform will thus be automatically stopped at the limit of its movement without danger of straining or breaking any of the parts of the mechanism. In this connection it will be remembered that the upper arm of the gear shifting lever 29 has a spring engagement with the notches of the rack 32 so that it can be forcibly moved in either direction and will remain in any adjusted position.

A slight modification is shown by Figs. 5 and 6, in which cables 56 are substituted for the endless chains 14, said cables passing around a grooved roller 57 upon the front transverse shaft 12, and being wound upon a roller 58 rigid with the upper transverse shaft 16 at the rear of the hay rack. The platform 33 is secured to the upper reaches of the cables 56 by means of suitable clips 59, being constructed exactly as previously described. The sliding gear 24 is rigid with a roller or cylinder 60 which is keyed upon the lower transverse shaft 17, said cylinder being loosely engaged by the collar 27 of the gear shifting lever, and having the clutch face 25 at one end thereof. The operation of the device is exactly as previously described, the sliding gear 24 being adapted to be moved into an intermediate position, as indicated by Fig. 5, so as to break all connection between the lower shaft 17 and the upper shaft 16, although the gear is adapted to be moved either to bring it into mesh with the gear wheel 19 of the upper shaft 16, or to bring the clutch faces 23 and 25 into engagement with each other.

A still further modification is shown by Fig. 7, in which a single cable 61 is substituted for the two cables 56. At the rear of the hay rack this cable 61 is wound upon a roller 58ᵃ rigid with the upper shaft 16. The sliding gear 24 is mounted upon the lower shaft 17 in substantially the same manner as illustrated by Fig. 5, so that when moved in one direction it will mesh with the gear 19 of the upper shaft 16, while when moved in the opposite direction, the clutch faces 23 and 25 will be brought into engagement with each other. The operation of the hay rack is exactly as previously described.

Instead of using a chain and sprocket drive between the two shafts when returning the platform 33 to the rear of the rack, a suitable detachable crank handle 62 may be fitted to one end of the upper shaft 16 and the operation performed manually. There being no load upon the platform 33 during the return movement thereof, this could be accomplished manually without difficulty.

For convenience in manipulating the flexible hand lever 50, a foot operated mechanism may be provided for flexing the same preparatory to shifting its position, said mechanism being shown more clearly by Fig. 8. A guide shoe 70 extends along the inner side of the lever, said guide shoe being carried by one arm of a bell crank lever 71 which is pivotally mounted upon the frame 10 at 72. The opposite arm of the bell crank lever 71 is connected to a plunger 73 which is slidably mounted within a suitable guide 74, and has a foot piece 75 applied to the upper end thereof. By pressing upon the plunger with the foot and forcing the same downwardly into the position indicated by dotted lines on Fig. 8, the guide shoe 70 is forced outwardly so as to flex the lever 51 and disengage it from the notches 54 of the keeper 53. The lever can then be readily shifted forward or backward, just as may be desired.

Having thus described the invention, what I claim as new and desire to secure by Letters Patent, is:—

1. A device of the character described including a running gear, a hay rack mounted thereon and formed with a bed, transverse shafts journaled upon the hay rack at opposite ends of the bed, a flexible member extending along the bed and having an operative connection with the transverse shafts, a platform secured to the flexible member so as to be moved back and forth upon the bed by the operation thereof, a third transverse shaft journaled upon one end of the bed, a driving connection between the third transverse shaft and the wheels of the running gear, a chain and sprocket connection between the third transverse shaft and the adjacent one of the first mentioned transverse shafts, one of the sprockets being loose upon its shaft, a sliding gear keyed upon the said shaft, a gear rigid with the other shaft and adapted to have the sliding gear moved into mesh therewith, and clutch means for locking the loose sprocket wheel with its shaft.

2. A device of the character described including a running gear, a hay rack mounted thereon and formed with a bed, transverse shafts journaled upon the hay rack at opposite ends of the bed, a flexible member extending along the bed and having an operative connection with the transverse shafts, a platform secured to the flexible member so as to be moved back and forth upon the bed by the operation thereof, a third transverse shaft journaled upon one end of the bed, a driving connection between the third transverse shaft and the wheels of the running gear, a chain and sprocket connection between the third transverse shaft and the adjacent one of the first mentioned transverse shafts, one of the sprocket wheels being loose upon its shaft, a sliding gear keyed upon the said shaft, a gear wheel rigid with the opposite shaft and adapted to have the sliding gear moved into mesh therewith, a clutch for locking the loose sprocket wheel with its shaft, and a shifting lever operatively connected with the sliding gear wheel and the clutch to close the clutch when the lever is moved in one direction and bring the gears into mesh when the levers are moved in the opposite direction.

3. A device of the character described including a running gear, a hay rack mounted thereon and formed with a bed, transverse shafts journaled upon the hay rack at opposite ends of the bed, a flexible member extending along the bed and having an operative connection with the transverse shafts, a platform secured to the flexible member so as to be moved back and forth upon the bed by the operation thereof, a third transverse shaft journaled upon the hay rack at one end of the bed, a driving connection between the third transverse shaft and the wheels of the running gear, a chain and sprocket connection between the third transverse shaft and the adjacent one of the first mentioned transverse shafts, one of the sprocket wheels being loose upon its shaft, a sliding gear keyed upon the said shaft, a gear wheel rigid with the opposite shaft and adapted to have the sliding gear moved into mesh therewith, coöperating clutch faces on the sliding gear and the loose sprocket wheel, means for moving the sliding gear in either direction to bring it into mesh with the gear wheel of the other shaft or close the clutch, and means actuated by the platform when it reaches one limit of its movement for automatically moving the sliding gear into an inoperative position.

4. A device of the character described including a running gear, a hay rack mounted thereon and formed with a bed, transverse shafts journaled upon the hay rack at opposite ends of the bed, a flexible member extending along the bed and operatively connected with the transverse shafts, a platform secured to the flexible member so as to be moved back and forth upon the bed by the operation thereof, a third transverse shaft journaled upon the bed at one end thereof, a driving connection between the third transverse shaft and the wheels of the running gear, a chain and sprocket connection between the third transverse shaft and the adjacent one of the first mentioned transverse shafts, one of the sprocket wheels being loose upon its shaft, a sliding gear keyed upon the said shaft, a gear wheel rigid with the opposite shaft and adapted to have the sliding gear brought into mesh therewith, coöperating clutch faces on the sliding gear and the loose sprocket wheel, the sliding gear being brought into mesh with the sprocket wheel of the other shaft when moved in one direction and closing the clutch when moved in the other direction, thereby enabling the platform to be moved either backward or forward, means actuated by the platform for automatically moving the sliding gear into an inoperative position when the platform reaches one limit of its movement, and means actuated by the platform for automatically breaking the driving connection with the wheels of the running gear when it reaches the opposite limit of its movement.

5. A device of the character described including a running gear, a hay rack mounted thereon and formed with a bed, transverse shafts journaled upon the hay rack at opposite ends of the bed, a flexible member extending along the bed and operatively connected with the transverse shafts, a platform secured to the flexible member so as to be moved back and forth upon the bed by the operation thereof, a third transverse shaft journaled upon the bed at one end thereof, a chain and sprocket connection between the third transverse shaft and the adjacent one of the first mentioned transverse shafts, one of the sprocket wheels being loose upon its shaft, a sliding gear keyed upon the said shaft, a gear wheel rigid with the opposite shaft and adapted to have the sliding gear brought into mesh therewith, coöperating clutch faces on the sliding gear and loose sprocket wheel, a shifting lever for moving the sliding gear in either direction, the two gear wheels being brought into mesh when it is moved in one direction, while the clutch is closed when it is moved in the opposite direction, yielding means for holding the shifting lever in an adjusted position, and means for automatically breaking the driving connection when the platform reaches the limit of its movement.

6. A device of the character described including a running gear, a hay rack mounted thereon and formed with a bed, transverse shafts journaled upon the hay rack at opposite ends of the bed, a flexible member extending along the bed and operatively connected to the transverse shafts, a platform secured to the flexible member so as to be moved back and forth upon the bed by the operation thereof, a third transverse shaft journaled upon the hay rack at one end of the bed, sprocket wheels upon the third transverse shaft, a clutch connection between the sprocket wheels and the said shaft, a driving connection between the sprocket wheels and the wheels of the running gear, a chain and sprocket connection between the third transverse shaft and the adjacent one of the first mentioned transverse shafts, one of the sprocket wheels being loose upon its shaft, a sliding gear keyed upon the said shaft, a gear wheel rigid with the opposite shaft and adapted to have the sliding gear brought into mesh therewith, coöperating clutch faces on the sliding gear and loose sprocket wheel, and a shifting lever connected to the sliding gear for moving it in either direction, the gear wheels being brought into mesh with each other when it is moved in one direction, while the clutch is closed when it is moved in the opposite direction.

7. A device of the character described including a running gear, a hay rack mounted thereon and formed with a bed, transverse shafts journaled upon the hay rack at opposite ends of the bed, a flexible member extending along the bed and operatively connected to the transverse shafts, a driving connection between one of the transverse shafts and the wheels of the running gear, a lever controlling the said driving connection, locking means for the lever, and a trip finger projecting from the platform, said finger being provided with cam means for unlocking the lever and with a shoulder for engaging the lever to move the same and break the driving connection when the platform reaches the limit of its movement.

8. A device of the character described including a running gear, a hay rack mounted thereon and formed with a bed, transverse shafts journaled upon the hay rack at opposite ends of the bed, a flexible member extending along the bed and having an operative connection with the transverse shafts, a platform secured to the flexible member so as to be moved back and forth upon the bed by the operation thereof, a driving connection between one of the transverse shafts and the wheels of the running gear, a lever controlling the said driving connection and constructed to flex laterally, a notched seat for receiving the lever to lock it against movement, and a trip finger upon the platform, said trip finger having a cam nose for flexing the lever laterally to disengage it from the notched seat, and being also provided with a shoulder for subsequently engaging the lever to move it and break the driving connection.

In testimony whereof I have signed my name to this specification in the presence of two subscribing witnesses.

GEORGE W. WURTZ.

Witnesses:
BERT SCHROLL,
L. F. HAMMELMANN.

Copies of this patent may be obtained for five cents each, by addressing the "Commissioner of Patents, Washington, D. C."